United States Patent
Yamashita et al.

(10) Patent No.: US 9,027,344 B2
(45) Date of Patent: May 12, 2015

(54) ELECTRICALLY DRIVEN TURBOCHARGER

(75) Inventors: Yukio Yamashita, Tokyo (JP); Noriyuki Hayashi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 98 days.

(21) Appl. No.: 13/384,821

(22) PCT Filed: Jun. 11, 2010

(86) PCT No.: PCT/JP2010/059937
§ 371 (c)(1),
(2), (4) Date: Jan. 26, 2012

(87) PCT Pub. No.: WO2011/067956
PCT Pub. Date: Jun. 9, 2011

(65) Prior Publication Data
US 2012/0240910 A1    Sep. 27, 2012

(30) Foreign Application Priority Data

Dec. 4, 2009   (JP) ................................ 2009-276417

(51) Int. Cl.
*F02B 39/10*    (2006.01)
*F02B 37/10*    (2006.01)
(Continued)

(52) U.S. Cl.
CPC ................. *F02B 39/10* (2013.01); *F02B 39/16* (2013.01)

(58) Field of Classification Search
CPC ...... F02B 39/16; F02B 39/10; F02D 41/0007; F02D 41/086; F02D 2001/0075; H02P 9/04; H02P 23/14; F02M 2700/333
USPC ................. 60/607–608; 123/559.1, 561, 564; 290/52
See application file for complete search history.

(56) References Cited

U.S. PATENT DOCUMENTS

| 6,823,853 | B2 * | 11/2004 | Clarkson et al. ............ 123/559.1 |
| 7,367,189 | B2 * | 5/2008 | Ishiwatari ....................... 60/608 |
| 2003/0110770 | A1 | 6/2003 | Criddle et al. |

FOREIGN PATENT DOCUMENTS

| EP | 2444628 A1 * | 4/2012 | .............. F02B 39/16 |
| JP | 2003-161156 A | 6/2003 | |

(Continued)

OTHER PUBLICATIONS

Machine translation of JP2006342738A (published Dec. 21, 2006) obtained from epo.org on Nov. 27, 2013 (see attached).*

(Continued)

*Primary Examiner* — Thai Ba Trieu
*Assistant Examiner* — Ngoc T Nguyen
(74) *Attorney, Agent, or Firm* — Birch, Stewart, Kolasch & Birch, LLP

(57) ABSTRACT

Rotational speed of an electric turbocharger controlled so that the actual temperature of the motor does exceed the allowable level even over a long time span. A speed control device for the turbocharger, includes a temperature sensor, a speed limitation device which limits the speed of the motor in response to the temperature level detected by the temperature sensor wherein the speed limitation device is provided with a limit control start temperature correction device which decreases the limit control start temperature when the increase rate of the detected temperature exceeds a threshold. A speed limitation setting device sets a speed limit based on the temperature difference between the limit control start temperature and the detected temperature T on a rate of increase of the detected temperature.

8 Claims, 4 Drawing Sheets

(51) Int. Cl.
 *F02B 37/00* (2006.01)
 *F02B 39/16* (2006.01)

(56) References Cited

FOREIGN PATENT DOCUMENTS

| JP | 2006-342738 A | 12/2006 | | |
| JP | 2009-228624 A | 10/2009 | | |
| JP | 2011-80415 A | 4/2011 | | |
| JP | 2011117383 A * | 6/2011 | ............... | F02B 39/16 |
| JP | 2012127332 A * | 7/2012 | ............... | F02B 37/10 |
| JP | 5215984 B2 * | 6/2013 | ............... | F02B 39/16 |

OTHER PUBLICATIONS

Chinese Notice of Allowance for Chinese Application No. 201080022781.4, dated Nov. 6, 2013, with an English translation.

* cited by examiner

ELECTRICALLY DRIVEN TURBOCHARGER

BACKGROUND OF THE INVENTION

1. Field of the Invention

The present invention relates to an electrically driven turbocharger which delivers turbocharged-air to an internal combustion engine by a motor driving the turbocharger, the invention being especially related to the speed control regarding the turbocharger so as to constrain the temperature of the motor.

2. Background of the Invention

In order to increase an engine power output and improve the transient response, a turbocharger which delivers turbocharged-air by an exhaust gas driving a turbine of the engine is known. Instead of the turbocharger, an electrically driven turbocharger (an electric turbocharger) or an electric compressor which delivers compressed air by an electric motor driving a compressor is proposed.

In the electric turbocharger or the electric compressor, a rotor of a high speed motor is directly connected with the compressor, and the speed of the motor reaches several ten-thousands to a hundred-thousand and several ten-thousands rpm.

The electric turbocharger is used mainly for vehicles. In this case, since the electric turbocharger is a vehicle-mounted product, the compactness and the countermeasures against high temperature are required. Further, since the engine torque changes in response to the flow rate of the supercharged air, it is required to control the speed of the motor so as to prevent a sudden change of the supercharged air flow rate or a sudden shutdown.

Therefore, as the compactness for a vehicle-mounted product is required, the degree of freedom regarding the design for cooling the motor is limited. There may be a problem that the temperature of the motor (winding wire or a magnet) exceeds an allowable limit level when the motor is operated beyond every conceivable operation pattern. When the temperature of the winding wire exceeds an allowable limit level, electric insulation deterioration or a short circuit may be caused and the operation shutdown may occur.

Further, when the temperature of the magnet exceeds an allowable limit level, the performance of the magnet may be deteriorated because of the irreversible demagnetization (a phenomenon in which the performance of the magnet cannot be restored even when the temperature is returned to the ordinary temperature).

On the other hand, in a case that the temperature of the motor (winding wire or the magnet) exceeds an allowable limit level, when the motor output is abruptly reduced (i.e. the motor speed is reduced) so as to reduce the heat generated by the motor loss, the flow rate of the supercharged air is also reduced and the influence on the engine torque appears. And the abrupt change in the engine torque not only causes the deterioration in drivability but also exposes the driver to danger. Thus, it is necessary to avoid the abrupt change in the engine torque.

In relation to the control for constraining the increase of the motor temperature regarding the electric turbocharger as described above, Patent Reference 1 (JP2006-342738) is known.

According to Patent Reference 1, when the winding wire temperature of the motor driving the compressor exceeds an ordinary temperature level, the change in the rotation speed of the compressor is mildly constrained based on a first increase rate of a gentle slope so as to prevent a torque shock or a turbo-charging interruption. And when the winding wire temperature gets close to a heat-resisting limit-temperature, the rotation speed of the compressor is rapidly constrained based on a second increase rate of a steep slope so as to prevent the winding wire temperature from making lunge into the range beyond the heat-resisting limit-temperature.

REFERENCES

Patent References

Patent Reference 1: JP2006-342738

SUMMARY OF THE INVENTION

Subjects to be Solved

On the other hand, according to the technology as explained above, the temperature increase regarding the winding wire, the motor and the part whose temperature is correlated with the temperature increase of the motor part such as the winding wire has a time constant of a long time span. Thus, as shown in FIG. 5, even when the rapid temperature increase due to heat generation is detected and the rotation speed is controlled, the actual response temperature may exceed the temperature allowable limit level (an overshoot response). Thus, there is an apprehension that, when the temperature exceeds the temperature allowable limit level, the operation shutdown due to the electric insulation deterioration or the electric short circuit may be caused or the performance deterioration due to the irreversible demagnetization of the magnet may be caused.

Further, according to Patent Reference 1, since the limitation control of the rotation speed is started when the winding wire temperature of the motor driving the compressor exceeds the ordinary temperature level, the start condition for starting the limitation control is set to an almost constant temperature. Thus, Patent Reference 1 does not disclose that the control starting temperature is a variable; further, in relation to the temperature increase, the temperature increase rate over the ordinary temperature level is not taken into consideration. Hence, the technology provided by Patent Reference 1 is not sufficient in avoiding the overshoot phenomenon regarding the actual temperature response.

Consequently, in view of the problems in the conventional technology, the present invention aims at providing an electric turbocharger whose rotation speed is appropriately controlled so that the actual temperature of the motor does not show an overshoot response beyond the allowable level during the temperature increase even in a case where the time constant regarding temperature measurement is of a long time span.

Means to Solve the Subjects

In order to solve the subjects as described above, the present invention provide a speed control device for an electric turbocharger which delivers turbocharged-air to an internal combustion engine by a motor driving the turbocharger, the speed control device including, but not limited to:

a speed limitation device which limits the speed of the motor when the temperature level detected by the temperature sensor exceeds a limit control start temperature, wherein the speed limitation device including, but not limited to:

a limit control start temperature correction device which decreases the limit control start temperature in a case that the increase rate of the temperature detected by the temperature sensor exceeds a threshold; and a speed limitation setting device which sets a speed limit level based on a temperature difference between the limit control start temperature and the detected temperature, as well as based on a increase rate of the detected temperature, after the detected temperature exceeds the limit control start temperature, wherein the speed of the motor is limited to the speed limit level set by the speed limitation setting device.

As described above, according to the present invention, the limit control start temperature correction device decreases the limit control start temperature in a case where the increase rate of the detected temperature detected by the temperature sensor exceeds a threshold. Thus, in a case of the abrupt heat generation, the speed limitation control is started in an early stage. Accordingly, the actual temperature can be surely prevented from exceeding the allowable limit, the temperature excess being, for instance, due to the temperature detection delay.

Further, in a case where detected temperature exceeds the limit control start temperature, the speed limitation setting device decreases the speed limit level of the motor. Thus, the heat generation and the temperature can be reduced. Moreover, the speed limit level is set based on the temperature difference between the limit control start temperature and the detected temperature as well as based on the increase rate regarding the detected temperature. In other words, the speed limit level is set by use of both the temperature difference and the rate of change of the temperature. Thus, the temperature can be quickly and surely decreased below the limit control start temperature. In this way, the deterioration of the winding wire and the magnet due to the high temperature can be prevented, and the motor performance deterioration can be avoided.

Further, a preferable embodiment of the present invention is the speed control device for the electric turbocharger, wherein the speed limitation setting device sets the speed limit level as a value obtained by subtracting reduced quantity based on the temperature difference and reduced quantity based on the increase rate of the detected temperature from a speed demand based on the operation condition of the engine.

As described above, the speed limit level is set by subtracting reduced quantity based on the temperature difference and reduced quantity based on the increase rate of the detected temperature from a speed demand based on the operation condition of the engine. Accordingly, the speed limit level is set based on the temperature difference between the limit control start temperature and the detected temperature as well as based on the increase rate regarding the detected temperature. Thus, in comparison with a case where the speed limitation is performed based on an index as only one parameter out of the temperature difference and the temperature increase rate, the speed limitation can quickly and surely constrain the overshoot in the abrupt temperature increase so as to decrease the temperature.

Further, another preferable embodiment of the present invention is the speed control device for the electric turbocharger, wherein:

the speed limitation setting device sets a speed limit level by multiplying the temperature difference between the limit control start temperature and the detected temperature by a constant as a temperature difference adjusting gain, so that the a speed limit level is decreased in response to the increase of the temperature difference.

Further, another preferable embodiment of the present invention is the speed control device for the electric turbocharger, wherein:

the speed limitation setting device sets a speed limit level by multiplying the temperature difference between the limit control start temperature and the detected temperature by the integration of the time increment in which the detected temperature exceeds the limit control start temperature as a temperature difference adjusting gain, so that the a speed limit level is decreased in response to the increase of elapsed time.

As described above, in setting the correction term with respect to the temperature difference between the limit control start temperature and the detected temperature, the temperature difference is multiplied by a constant as a temperature difference adjusting gain before the temperature difference is simply used. Hence, in a case where the temperature difference becomes greater, the speed limit level can be decreased in response to the increase of the temperature difference. Further, in setting the correction term with respect to the temperature difference between the limit control start temperature and the detected temperature, the temperature difference is multiplied by a value as a temperature difference adjusting gain, the value being computed based on the integration of the time increment in which the detected temperature exceeds the limit control start temperature. Hence, the speed limit level can be decreased in response to the increase of elapsed time. In this way, the temperature decrease can be quickly and surely achieved.

Further, another preferable embodiment of the present invention is the speed control device for the electric turbocharger, wherein:

the speed limitation setting device sets a speed limit level by multiplying the increase rate after the detected temperature exceeds the limit control start temperature by a constant as a temperature increase rate adjusting gain, so that the a speed limit level is decreased in response to the increase of the temperature increase rate.

Further, another preferable embodiment of the present invention is the speed control device for the electric turbocharger, wherein:

the speed limitation setting device sets a speed limit level by multiplying the increase rate after the detected temperature exceeds the limit control start temperature by a variable obtained based on the detected temperature as a temperature increase rate adjusting gain, so that the a speed limit level is decreased in response to the increase of the temperature.

As described above, in setting the correction term with respect to the increase rate regarding the detected temperature, the increase rate is multiplied by a constant as a temperature increase rate adjusting gain before the temperature increase rate is used. Hence, the speed limit level can be decreased in response to the increase of the increase rate regarding the detected temperature. Further, in setting the correction term with respect to the increase rate regarding the detected temperature, the temperature increase rate is multiplied by a variable as a temperature increase rate adjusting gain, the variable being obtained based on the detected temperature. Hence, the speed limit level can be decreased in response to the increase of the temperature, namely, more responsive to the temperature increase rate. In this way, the temperature decrease can be quickly and surely achieved.

Effects of the Invention

According to the present invention, even in a case where the time constant regarding temperature measurement is of a long time span, the speed of the motor can be controlled so that the actual temperature of the motor does not show an overshoot response beyond the allowable level during the temperature increase.

In other words, in a case where the increase rate of the detected temperature detected by the temperature sensor exceeds a threshold, the limit control start temperature correction device decreases the limit control start temperature. Thus, in a case of the abrupt heat generation, the speed limitation control is started in an early stage. Accordingly, the actual temperature can be surely prevented from causing an overshoot response beyond the allowable level during the temperature increase.

Further, in a case where the speed limitation is performed and the actual temperature is still beyond the speed limit level, the speed limitation setting device decreases the speed limit level. Accordingly, the heat generation and the temperature can be reduced. Moreover, the speed limit level is set based on the difference between the limit control start temperature and the detected temperature as well as based on the increase rate regarding the detected temperature; namely, the speed limit level is set by use of both the temperature difference and the rate of change of the temperature. Thus, the temperature can be quickly and surely decreased below the limit control start temperature. In this way, the deterioration of the winding wire and the magnet due to the high temperature can be prevented, and the motor performance deterioration can be avoided.

BRIEF DESCRIPTION OF THE DRAWINGS

The present invention will now be described in greater detail with reference to the modes of the present invention, the preferred embodiments of the present invention and the accompanying drawings, wherein.

DETAILED DESCRIPTION OF THE PREFERRED MODES

First Mode

Hereafter, the present invention will be described in detail with reference to the modes or embodiments shown in the figures. However, the dimensions, materials, shape, the relative placement and so on of a component described in these modes or embodiments shall not be construed as limiting the scope of the invention thereto, unless especially specific mention is made.

Figure 1:
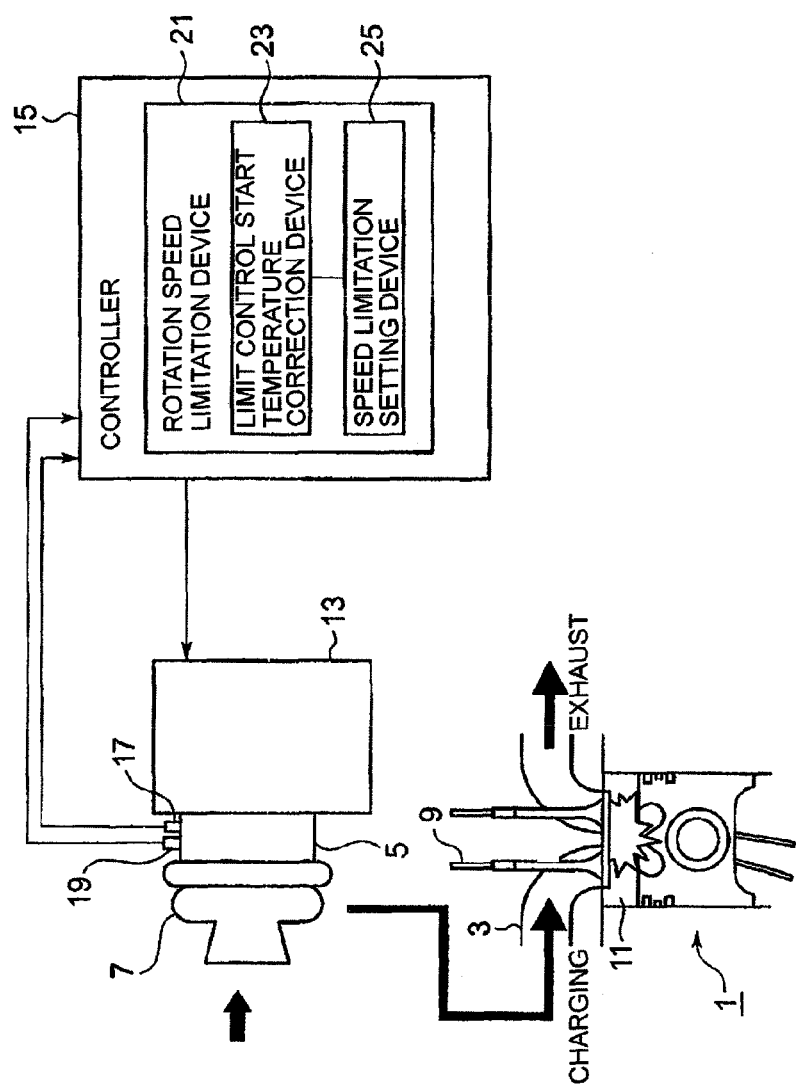
FIG. 1 shows the whole configuration of a rotation speed control device of an electric turbocharger according to the present invention.

FIG. 1 shows the whole configuration of a rotation speed control device of an electric turbocharger according to a first mode of the present invention. In a charging air passage 3 of an engine 1, a compressor (a turbocharger) 7 driven an electric motor 5 is provided. Incidentally, the compressor 7 is a centrifugal compressor, a Roots type compressor, a Lysholm compressor or a compressor of an already known type. And the type of the compressor is not limited to a special type of compressor. The present invention will be explained by use of an example of the centrifugal compressor.

The rotation shaft of the impeller as a configuration member of the compressor 7 is connected to the rotation shaft of the motor 5 so that the rotation of the motor 5 is directly transmitted to rotation of the impeller; namely, the rotation speed of the motor 5 is the rotation speed of the compressor 7.

When the rotation speed of the compressor 7 is increased and the turbocharging is started, the turbocharged-air streams toward the downstream of the charging air passage 3, and the turbocharged air enters the inside of a combustion chamber 11 via an intake valve 9 provided at each cylinder of the engine.

Further, the rotation speed of the motor 5 is controlled by an inverter 13. And the inverter 13 is controlled based on the control signal transmitted from a controller 15.

The controller 15 includes, but not limited to: a memory unit that memorizes a control program and a control map; and a processing unit that performs a time-counting and numerical computations. The input signals inputted into the controller 15 includes, but not limited to: a signal regarding the temperature of the motor or the other configuration member which is correlated with the motor temperature, the signal being detected by a temperature sensor 17; and a signal regarding the rotation speed of the compressor 7, the signal being detected by a rotation speed sensor 19. Further, when the inverter has a function so as to do away with the motor rotation speed sensor, the rotation speed sensor 19 can be dispensed with.

In addition, the inverter and the controller can be integrated into one unit.

With regard to the temperature of the motor 5, the explanation is given based on an example case where the temperature of the motor winding wire is detected; however, instead of the motor winding wire temperature, the other part temperature such as the motor rotation-bearing temperature, the motor magnet temperature, the inverter temperature or the temperature of charging air pressurized by the compressor 7 may be detected and used, the other part temperature being correlated with the motor winding wire temperature.

Further, in the processing unit of the controller 15, a rotation speed limitation device (a speed limitation device) 21 is provided so as to perform the speed limitation for the motor 5 in a case where the detected value detected by the temperature sensor 17 exceeds a limit control start temperature; the speed limitation device 21 is provided with: a limit control start temperature correction device 23 so as to decrease the limit control start temperature in a case where the increase rate regarding the detected temperature detected by the temperature sensor 17 exceeds a threshold value K; and, a speed limitation setting device 25 so as to set a speed limit level based on the difference between the limit control start temperature Tm and the detected temperature T as well as based on the increase rate regarding the detected temperature, after the detected temperature exceeds the limit control start temperature. Thus, the speed of the motor 5 is controlled so as to stay below the speed limit level set by the speed limitation setting device 25.

Figure 2:
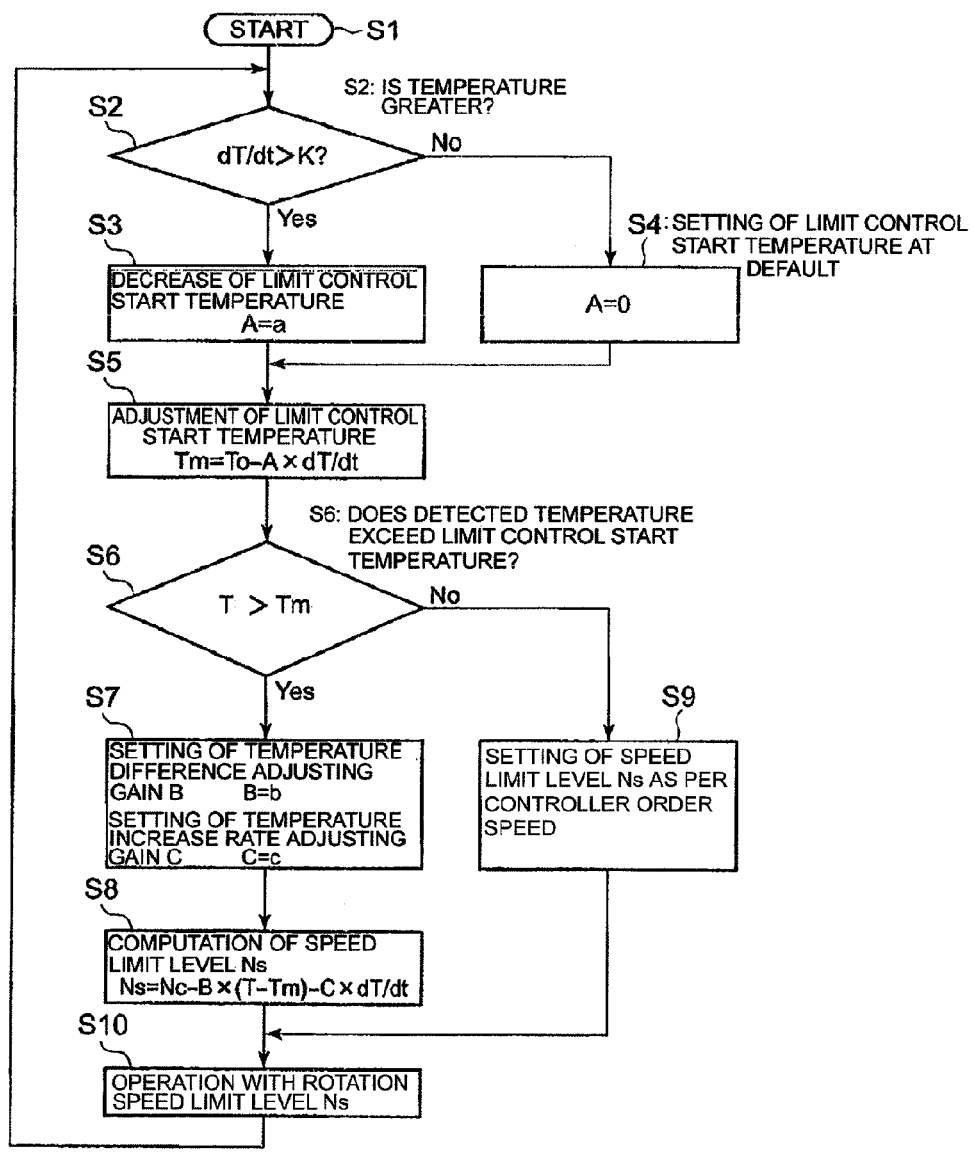
FIG. 2 shows the control flowchart of the rotation speed control device according to a first mode of the present invention.

Based on the flowchart of FIG. 2, regarding the speed limitation device 21, the speed control regarding the motor 5 is hereby explained.

A series of processes is started at the step S1; the step S1 is followed by the step S2 where it is judged, based on the signals detected by the temperature sensor 17, whether or not the rate of change of the temperature with respect to elapsed time (a temperature derivative change-rate dT/dt regarding elapsed time) is greater than the threshold value K. When the temperature derivative dT/dt is greater than the threshold value K, it is judged that the motor temperature abruptly increases. In the following step S3, a temperature increase rate adjusting gain A is set so as to decrease the limit control start temperature Tm. For instance, it is set that A=a (a is hereby a constant). The step S3 is followed by the step S5 where the limit control start temperature Tm is computed by use of the following equation (1).

$$Tm = T_0 - A \times dT/dt \quad (1)$$

Figure 4:
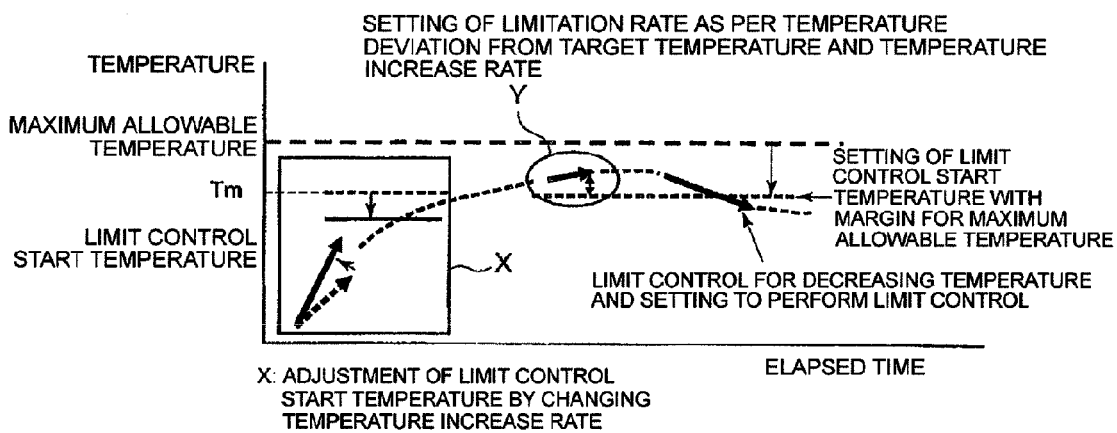
FIG. 4 explains the temperature change by use of the rotation speed control device according to the present invention; and, FIG. 5 explains the relationship between the actual temperature transition and the allowable limit level in the conventional technology.
Figure 5:
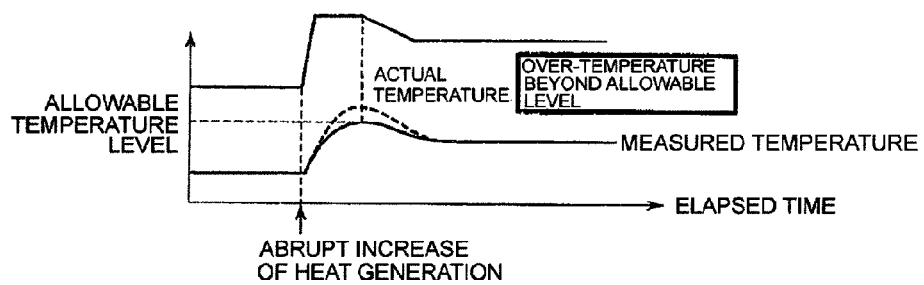

Hereby, $T_0$ is an initial set-value regarding the limit control start temperature Tm; the initial set-value $T_0$ is set so as not to make the target temperature reach the maximum allowable temperature with a safety margin; namely, the initial set-value $T_0$ is set as a temperature with a margin on the lower temperature side (cf. FIG. 4). In addition, the maximum allowable temperature is determined with a consideration that, when the motor temperature exceeds the maximum allowable temperature, the function of the motor is spoiled.

As described above, the limit control start temperature Tm is set by correcting the initial set-value $T_0$.

In a case where it is judged, in the step S2, that the temperature derivative dT/dt does not exceeds the threshold value K, the step S2 is followed by the step S4 where a default value is taken for the limit control start temperature Tm; and, A is set as 0 (A=0). In the step S5 following step S4, the limit control start temperature Tm is set as the initial set-value $T_0$; thus, based on the initial set-value, it is judged whether or not the limit control is started.

In the steps S2, S3, S4 and S5, with regard to the setting of the limit control start temperature Tm, as shown by the arrows in the rectangle frame X of FIG. 4, the limit control start temperature Tm is decreased when the temperature derivative dT/dt exceeds the threshold value K and becomes greater; and, the limit control start temperature Tm can be decreased as the temperature derivative dT/dt becomes greater. In this way, in a case of the abrupt temperature increase (heat generation), the speed limitation control is started in an early stage; thus, the actual temperature can be surely prevented from exceeding the allowable limit, the temperature excess being, for instance, due to the temperature detection delay.

In addition, with regard to the setting of the limit control start temperature, the steps S2, S3, S4 and S5 are performed by the limit control start temperature correction device 23 in the controller 15.

In the following step S6, it is judged whether or not the temperature set by the temperature signals from the temperature sensor 17 exceeds the limit control start temperature Tm; when the former exceeds the latter, the step S6 is followed by the step S7 where a temperature difference adjusting gain B and a temperature increase rate adjusting gain C are set. Thereby, the adjusting gains B and C are used for setting a speed limit level Ns for limiting the speed of the motor 5.

In this first mode of the present invention, the temperature difference adjusting gain B is set at b as a constant (e.g. B=b), and the temperature increase rate adjusting gain C is set at c as a constant (e.g. C=c); in the following step S8, the speed limit level Ns is computed by use of the following equation (2).

$$Ns = Nc - B(t - Tm) - C \times dT/dt \quad (2)$$

Hereby, Nc is a speed demand that is previously set and stored in a form of a map in the memory unit in the controller 15. And, the speed demand Nc for the compressor 7 is previously set with regard to the operation conditions such as the engine speed and the engine loads as well as with regard to the environment conditions. Further, B is the temperature difference adjusting gain; C is the temperature increase rate adjusting gain; T is the actual temperature signal (the detected temperature level) detected by the temperature sensor 17; and, Tm is the limit control start temperature Tm.

Consequently, the speed limit level Ns is set by subtracting B (T−Tm) and C×dT/dt from Nc, whereby, Nc is the speed demand (an order speed) based on the operation condition; B (T−Tm) is a subtracting value based on the temperature difference; and, C×dT/dt is a subtracting value based on the temperature increase rate.

In this way, the speed limit level is set based on the temperature difference between the limit control start temperature Tm and the detected temperature T as well as based on the detected temperature increase rate dT/dt. Thus, in comparison with a case where the speed limitation is performed based on an index as only one parameter out of the temperature difference and the temperature increase rate, the speed limitation in this mode can constrain the overshoot in the abrupt temperature increase; and, the temperature can be quickly and surely decreased.

The temperature difference adjusting gain B and the temperature increase rate adjusting gain C are the parameters to be set so that: the temperature does not exceed the maximum allowable temperature after the limitation control is started; the temperature is decreased by the limit control; and the drivability deterioration caused by the rapid engine torque change in response to the abrupt engine speed decrease can be avoided.

According to the first mode as described thus far, when the temperature is abruptly increased, the speed limitation control is started in an early stage by the limit control start temperature correction device 23; thus, the actual temperature is surely prevented from exceeding the allowable limit level, the temperature increase excess being, for instance, due to the temperature detection delay Further, in a case where the temperature exceeds the limit control start temperature, the speed limit level regarding the motor 5 is decreased by speed limitation setting device 25; thus, the generated heat and the temperature can be decreased. Moreover, the speed limit level is set based on the difference between the limit control start temperature Tm and the detected temperature T as well as based on the increase rate dT/dt regarding the detected temperature; namely, the speed limit level is set by use of both the temperature difference and the rate of change of the temperature. Thus, the temperature can be quickly and surely decreased below the limit control start temperature. In this way, the deterioration of the winding wire and the magnet due to the high temperature can be prevented, and the motor performance deterioration can be avoided.

Further, the speed limit level is set based on the adjustment of the limit control start temperature, the temperature difference between the limit control start temperature Tm and the detected temperature T, and the increase rate dT/dt regarding the detected temperature; thus, the motor speed control can be performed from an early stage, so as to further surely avoid the temperature increase. In this way, the drivability deterioration caused by the rapid engine torque change in response to the abrupt engine output decrease can be avoided.

Second Mode

Figure 3:
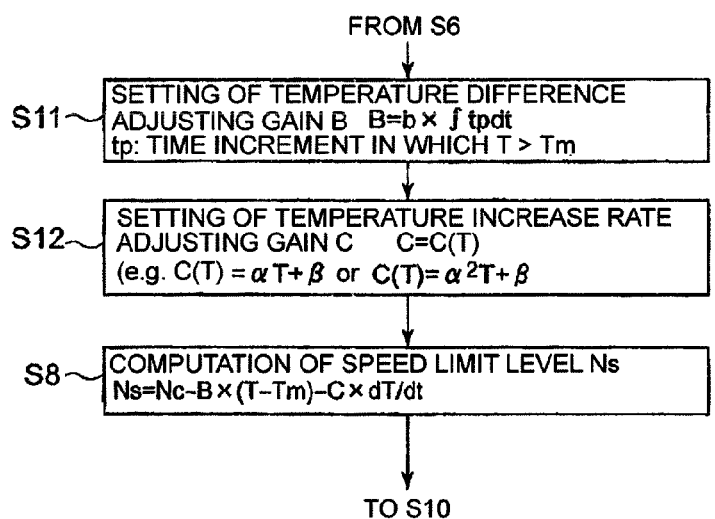
FIG. 3 shows the major configuration regarding the control flowchart of the rotation speed control device according to a second mode and a third mode of the present invention.

Based on FIG. 3, a second mode of the present invention is now explained.

In the first mode, the temperature difference adjusting gain B is set as a constant. On the other hand, in this second mode, as shown in the description of the step S11, the temperature difference adjusting gain B is set so that B b×∫tp dt. Hereby, in determining the variable B, the integrated time, namely, a time increment in which the detected temperature exceeds the limit control start temperature Tm is used.

As described above, the temperature difference adjusting gain B is a variable obtained by integrating the time increment in which the detected temperature T exceeds the limit control start temperature Tm; in this way, the speed limit level regarding the speed limit control is further decreased in a case where the detected temperature exceeds the limit control start temperature Tm for a long time span. Thus, the temperature can be further quickly decreased.

Third Mode

Based on FIG. 3, a third mode of the present invention is now explained.

In the first mode, the temperature increase rate adjusting gain C is set as a constant. On the other hand, in this third mode, as shown in the description of the step S12, the temperature increase rate adjusting gain C is set as a variable that is obtained from a function C=C(T) with respect to the temperature T. To be more specific, for instance, the function C=C(T) may be in a form C(T)=αT+β or in a form C(T)=α²T+β).

As described above, the temperature increase rate adjusting gain C is set as a function with respect to the detected temperature T. In this way, when the detected temperature is high, the correction becomes further sensitive to the rate of change of the temperature dT/dt. Accordingly, the temperature can be surely prevented from exceeding the maximum allowable level (cf. FIG. 4).

Further, the function-form C(T) as described above is only an example; the function C(T) may be set so that:

the temperature does not exceeds the maximum allowable temperature after the limitation control is started;

the temperature is decreased by the limit control; and the drivability deterioration caused by the rapid engine torque change in response to the abrupt engine speed decrease is avoided.

Incidentally, in the second mode, the setting regarding the temperature difference adjusting gain B is described as a variable; in the third mode, the setting regarding the temperature increase rate adjusting gain C is described as a variable. However, it goes without saying that both the second mode and the third mode may be combined so as to be performed at the same time; further, it goes without saying that one of the second mode and the third mode may be performed alone by use of the variable, and the adjusting gain of the other mode may be a constant.

INDUSTRIAL APPLICABILITY

According to the present invention, the rotation speed of the electric turbocharger is appropriately controlled so that the actual temperature of the motor does not show an overshoot response beyond the allowable level during the temperature increase even in a case where the time constant regarding temperature measurement is of a long time span. Hence the present invention is suitably applicable to the speed control device of the electric turbocharger.

The invention claimed is:

1. A speed control device for an electric turbocharger which delivers turbocharged-air to an internal combustion engine by a motor driving the electric turbocharger, the speed control device comprising:

a temperature sensor configured to detect one of a temperature of a motor winding wire, a temperature of a motor rotation-bearing temperature, an inverter temperature, and a temperature of charging air pressurized by a compressor;

a rotational speed sensor configured to detect a rotational speed of the motor; and a controller, including a processing unit, configured to receive input signals from both of the temperature sensor and the rotational speed sensor and limit the rotational speed of the motor when a temperature detected by the temperature sensor exceeds a limit control start temperature, the controller having executable instructions stored on a non-transitory readable medium to execute the steps of:

determining an increase rate of the temperature detected by the temperature sensor over time;

judging whether the determined increase rate exceeds a predetermined threshold;

when the increase rate exceeds the threshold,
decreasing the limit control start temperature,
setting a speed limit based on a temperature difference between the limit control start temperature and the temperature detected by the temperature sensor, as well as based on the increase rate of the detected temperature over time;
wherein the step of setting the speed limit comprises multiplying the temperature difference between the limit control start temperature at which a limitation control of the rotation speed of the motor is started and the detected temperature by a temperature difference adjusting coefficient to decrease the speed limit in response to the increase of the temperature difference; and controlling the rotational speed of the motor of the electric turbocharger in response to the set speed limit to prevent motor operation shutdown.

2. A speed control device for the electric turbocharger according to claim 1, wherein:

the speed limit is set as a value obtained by subtracting a reduced speed calculated based on the temperature difference and reduced speed based on the increase rate of the detected temperature from a speed demand calculated based on the operating condition of the engine.

3. A speed control device for an electric turbocharger which delivers turbocharged-air to an internal combustion engine by a motor driving the electric turbocharger, the speed control device comprising:

a temperature sensor configured to detect one of a temperature of a motor winding wire, a temperature of a motor rotation-bearing temperature, an inverter temperature, and a temperature of charging air pressurized by a compressor;

a rotational speed sensor configured to detect a rotational speed of the motor; and a controller, including a processing unit, configured to receive input signals from both of the temperature sensor and the rotational speed sensor and limit the rotational speed of the motor when a temperature detected by the temperature sensor exceeds a limit control start temperature, the controller having executable instructions stored on a non-transitory readable medium to execute the steps of:

determining an increase rate of the temperature detected by the temperature sensor over time;

judging whether the determined increase rate exceeds a predetermined threshold;

when the increase rate exceeds the threshold,
  decreasing the limit control start temperature,
    setting a speed limit based on a temperature difference between the limit control start temperature and the temperature detected by the temperature sensor, as well as based on the increase rate of the detected temperature over time;
      wherein the step of setting the speed limit comprises multiplying the temperature difference between the limit control start temperature at which a limitation control of the rotation speed of the motor is started and the detected temperature by a temperature difference adjusting coefficient based on a time increment in which the detected temperature exceeds the limit control start temperature to decrease the speed limit in response to the increase of elapsed time; and
controlling the rotational speed of the motor of the electric turbocharger in response to the set speed limit to prevent motor operation shutdown.

4. A speed control device for the electric turbocharger according to claim 3, wherein:
the speed limit is set as a value obtained by subtracting a reduced speed calculated based on the temperature difference and reduced speed based on the increase rate of the detected temperature from a speed demand calculated based on the operating condition of the engine.

5. A speed control device for an electric turbocharger which delivers turbocharged-air to an internal combustion engine by a motor driving the electric turbocharger, the speed control device comprising:
a temperature sensor configured to detect one of a temperature of a motor winding wire, a temperature of a motor rotation-bearing temperature, an inverter temperature, and a temperature of charging air pressurized by a compressor;
a rotational speed sensor configured to detect a rotational speed of the motor; and
a controller, including a processing unit, configured to receive input signals from both of the temperature sensor and the rotational speed sensor and limit the rotational speed of the motor when a temperature detected by the temperature sensor exceeds a limit control start temperature, the controller having executable instructions stored on a non-transitory readable medium to execute the steps of:
determining an increase rate of the temperature detected by the temperature sensor over time;
judging whether the determined increase rate exceeds a predetermined threshold;
when the increase rate exceeds the threshold,
  decreasing the limit control start temperature,
    setting a speed limit based on a temperature difference between the limit control start temperature and the temperature detected by the temperature sensor, as well as based on the increase rate of the detected temperature over time;
      wherein the step of setting the speed limit comprises multiplying the increase rate of the detected temperature when the detected temperature exceeds the limit control start temperature at which limitation control of the rotation speed of the motor is started by a temperature increase rate adjusting coefficient to decrease the speed limit in response to the increase of the increase rate of the detected temperature; and
controlling the rotational speed of the motor of the electric turbocharger in response to the set speed limit to prevent motor operation shutdown.

6. A speed control device for the electric turbocharger according to claim 5, wherein:
the speed limit is set as a value obtained by subtracting a reduced speed calculated based on the temperature difference and reduced speed based on the increase rate of the detected temperature from a speed demand calculated based on the operating condition of the engine.

7. A speed control device for an electric turbocharger which delivers turbocharged-air to an internal combustion engine by a motor driving the electric turbocharger, the speed control device comprising:
a temperature sensor configured to detect one of a temperature of a motor winding wire, a temperature of a motor rotation-bearing temperature, an inverter temperature, and a temperature of charging air pressurized by a compressor;
a rotational speed sensor configured to detect a rotational speed of the motor; and
a controller, including a processing unit, configured to receive input signals from both of the temperature sensor and the rotational speed sensor and limit the rotational speed of the motor when a temperature detected by the temperature sensor exceeds a limit control start temperature, the controller having executable instructions stored on a non-transitory readable medium to execute the steps of:
determining an increase rate of the temperature detected by the temperature sensor over time;
judging whether the determined increase rate exceeds a predetermined threshold;
when the increase rate exceeds the threshold,
  decreasing the limit control start temperature,
    setting a speed limit based on a temperature difference between the limit control start temperature and the temperature detected by the temperature sensor, as well as based on the increase rate of the detected temperature over time;
      wherein the step of setting the speed limit comprises multiplying the increase rate of the detected temperature after the detected temperature exceeds the limit control start temperature at which a limitation control of the rotation speed of the motor is started by a temperature increase rate adjusting coefficient obtained based on the detected temperature to decrease the speed limit in response to the increase of the temperature; and
controlling the rotational speed of the motor of the electric turbocharger in response to the set speed limit to prevent motor operation shutdown.

8. A speed control device for the electric turbocharger according to claim 7, wherein:
the speed limit is set as a value obtained by subtracting a reduced speed calculated based on the temperature difference and reduced speed based on the increase rate of the detected temperature from a speed demand calculated based on the operating condition of the engine.

* * * * *